May 10, 1932. H. G. WEDLER 1,857,418
SEAT COVER
Filed Nov. 9, 1927 2 Sheets-Sheet 1

Inventor.
Harry G. Wedler,
by Rippey & Kingsland.
His Attorneys.

May 10, 1932.  H. G. WEDLER  1,857,418
SEAT COVER
Filed Nov. 9, 1927  2 Sheets-Sheet 2
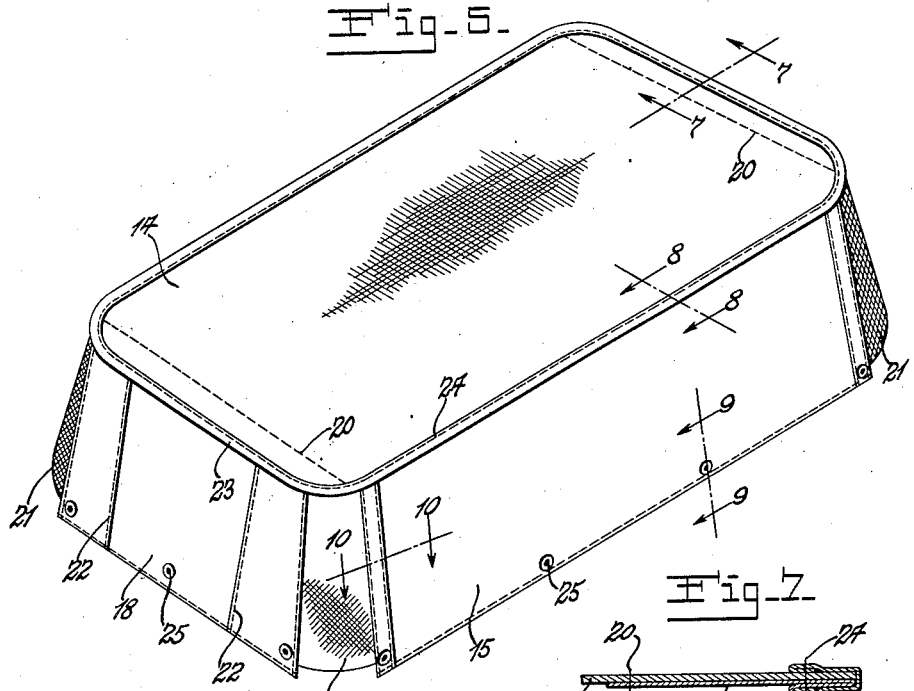
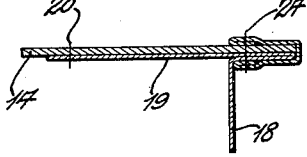
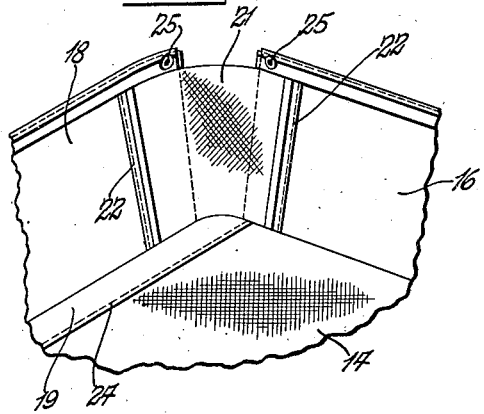
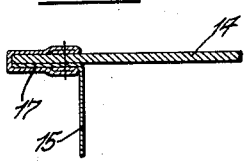
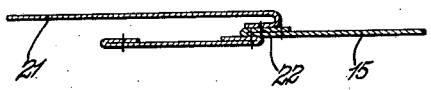
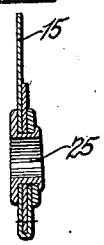
Inventor:
Harry G. Wedler,
by Rippey & Kingsland.
His Attorneys.

Patented May 10, 1932

1,857,418

UNITED STATES PATENT OFFICE

HARRY G. WEDLER, OF ST. LOUIS, MISSOURI, ASSIGNOR TO THE WEDLER-SHUFORD CO., OF ST. LOUIS, MISSOURI, A CORPORATION OF MISSOURI

SEAT COVER

Application filed November 9, 1927. Serial No. 232,044.

This invention relates to seat covers for use in connection with seat cushions, such as those used in automobiles, although the usefulness of the device is not restricted to automobile seat cushions.

An object of the invention is to provide a seat cover comprising a section of appropriate material for covering the main exposed portion of a seat or cushion and having its edges conforming generally to the contour of the edges of the said seat or cushion, and having flaps attached to edges thereof arranged to enfold corresponding edges of the seat or cushion, in combination with corner flaps for enfolding the corners of the seat or cushion without forming objectionable folds in any of the flaps.

By this construction the capability of satisfactory use of the device in connection with seats or cushions of different sizes is greatly extended. Thus, the principal covering portion of the seat cover may be made of any appropriate material of the approximate contour of the top of the seat or cushion on which the cover is to be used. And, by embodying my present invention in connection with said principal covering portion of the seat cover, the device may be satisfactorily used on seats or cushions of various sizes, because the various flaps readily conform to the curvature and contour of the edges of the seats or cushions of various sizes.

A general object of the invention is to produce an improved seat cover capable of obtaining these and other advantages made apparent by the following description, reference being made to the drawings, in which Fig. 1 is a top plan view of my improved seat cover.

Fig. 5 is a perspective view showing a variation of the invention.

Fig. 6 is a view showing one corner of the device turned inside out.

Figure 1:
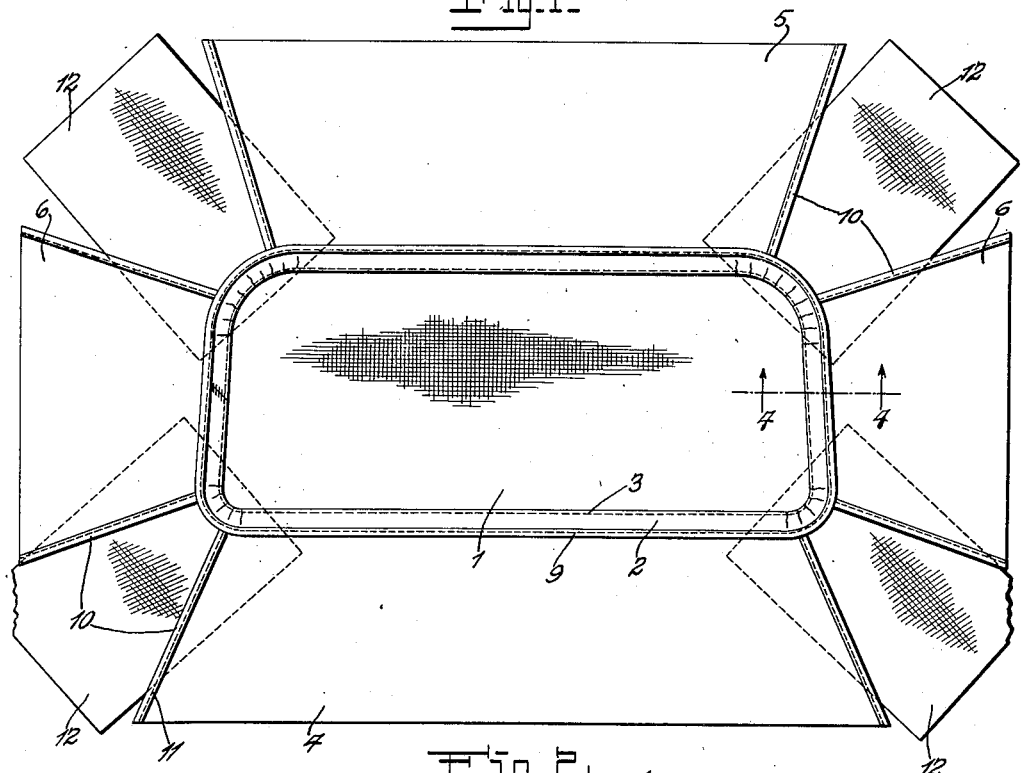
Figure 2:
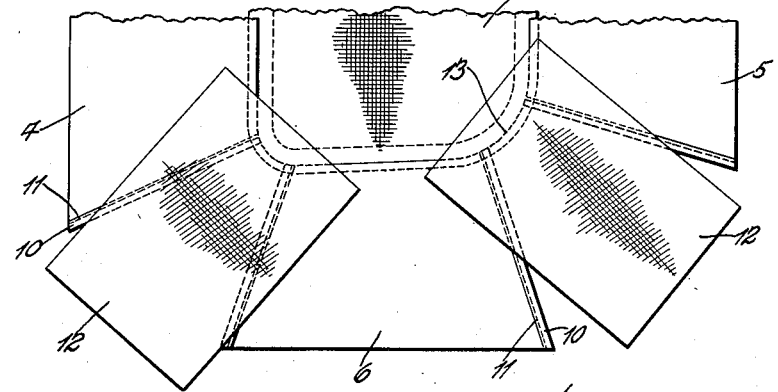
Fig. 2 is a bottom plan view of one end of the cover.
Figure 3:
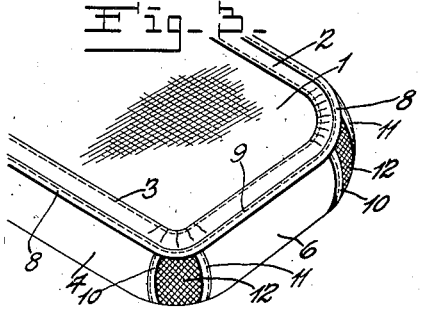
Fig. 3 is a perspective view showing one end of the device upon a seat cushion.
Figure 4:
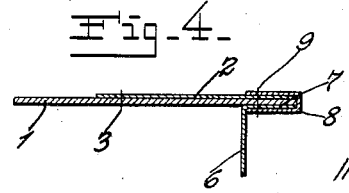
Fig. 4 is a sectional view on the line 4—4 of Fig. 1.

Figs. 7, 8, 9 and 10 are sectional views on the lines 7—7, 8—8, 9—9 and 10—10, respectively, of Fig. 5.

The improved seat cover shown on Sheet 1 of the drawings comprises a main seat covering portion 1 having its side edges conforming generally to the contour of the side edges of the seat or cushion to which the device is to be applied. This covering portion 1 may be made of any material adaptable to this purpose, and I suggest, but do not restrict myself to, the use of matting as being a suitable material for such use, since this material possesses the desirable qualities of flexibility and strength.

Along the upper side of the margin of the covering portion 1 a relatively wide strip 2 of cloth, leather or other appropriate material is secured by a row of stitches 3 running along the inner edge portion of said strip 2, and thereby securing the strip 2 in connection with the covering portion 1 at relatively a considerable distance from the marginal edge of said portion 1. This obtains the desired additional strength or reinforcement for the connection of the attached flaps.

A front flap 4, a rear flap 5 and two end flaps 6 are shown secured to the main seat covering portion 1 in order to enfold the front and rear sides and the ends of the seat or cushion. Obviously, one or more of these flaps may be omitted, if desired. Edge portions 7 of these flaps are folded against the under side of the main seat covering portion 1 along the edge thereof, and the edges of the three thicknesses of material, comprising the seat covering portion 1, the strip 2 and the folded edges 7 of the said flaps are enclosed by a folded binder strip 8, and a row of stitches 9 secures the parts in this relationship. All of these parts cooperate to obtain the desired strength in order that the flaps may be satisfactorily used to fold around the edges of a seat or cushion, irrespective of whether the area of the main covering portion 1 equals or is less than the area of the cushion or seat to which the device is applied.

The flaps 4, 5 and 6 may widen from the lines of their connection with the main covering portion 1 toward their free edges, being flared and having their respective flaring edges enclosed by strips 10 of binding secured thereto by rows of stitches 11. The bindings 10 extend from the edges of said flaps that are connected with the main covering portion 1 throughout the width of said flaps to the outer edges thereof.

As shown, the edges of the flaps are secured to the main covering portion 1 in a relationship in which their adjacent edges are spaced apart and the adjacent edges of the respective flaps diverge outwardly from their connections with the covering portion 1. Thus, flaring spaces are left between the flaps so that when the flaps are folded around the edges of a seat or cushion a space between the adjacent flaps is left at each corner of the seat or cushion. To obtain a more perfect cover for the seat or cushion, it is desirable that these spaces on the seat or cushion also be covered and, for this purpose, I secure to each corner of the covering portion 1 a flap 12 extending angularly from the corners of said covering portion and spanning the entire width of the space between the other flaps when said other flaps are folded to enclose the edges of the seat or cushion. These flaps 12 are preferably of elastic material and have their inner ends secured to the covering portion 1 by stitches 13 which may be a part of the row of stitches 9, or a separate row of stitches, as desired. The flaps 12 preferably have their edges overlapped by the edges of the adjacent flaps 4, 5 and 6, so that when the device is folded upon a seat or cushion a neat and ornamental appearance is obtained. But such overlapping is not essential in this device.

A variation of the invention is shown on Sheet 2 of the drawings. In this construction the covering portion 14 is provided with a front flap 15 and a rear flap 16. These flaps have their marginal edges 17 folded against the under side of the covering portion 1. End flaps 18 have widely extended edges 19 (Fig. 7) lying against the under side of the end portions of the part 1 and secured thereto by rows of stitches 20. Preferably, the ends of the flaps 15 and 16 are spaced from the ends of the flaps 18, leaving spaces between said flaps at the corners of the device, as will be readily understood by reference to Fig. 5. To perfect this device it is desirable that these spaces on the seat or cushion also be covered and, for this purpose, I secure to each corner of the covering portion 14 a flap 21 extending angularly from the corners of said covering portion and spanning the entire width of the space between the other flaps. The edges of the flaps 21 are overlapped by the ends of the adjacent flaps and are secured thereto by rows of stitches 22 near the edges of the flaps 21, preferably a considerable distance from the ends of the other flaps. These flaps 21 are preferably of elastic material.

A folded binder strip 23 encloses the edge of the seat covering portion 14 and enfolds the edges of the various flaps, said parts being secured together by a row of stitches 24. Thus, it will be seen that this device constitutes a bag or box-like structure capable of application upon seats or cushions of various sizes and that, when applied, the various flaps may be folded or tucked under the seat or cushion to form a useful and ornamental protecting cover therefor. Because of the elasticity of the corner flaps 21 the capability of satisfactory use of the device in connection with seats or cushions of different sizes is largely extended. If desired, the side and end flaps may be provided with fastener connections 25 for engaging with any appropriate fastening devices.

It is now clear that the seat covering sections 1 and 14 have their side edges conforming generally to the shape and to the contour of the side edges of the seat or cushion to which it is intended that the device be applied. The strips 2 and 23 enfolding the edges of the sections 1 and 14 provide strengthening plies therefor and also provide desirable pliable frames for said seat covering sections at the corners formed by the intersection of the said edges of the seat with the upper surface of the seat. In addition to functioning as a reenforcement and strengthening pliable frame, this construction also functions to guide the workmen in locating and placing the device in proper position upon the seat.

Thus, it will be seen that my improved seat cover may readily be applied to seats or cushions of various sizes, and that the necessity of making the device in a plurality of sizes is eliminated, resulting in a distinct economy and convenience to dealers and the public. I am aware that the construction of the device may be varied in numerous respects without departure from the nature and principle of the invention. I do not restrict myself unessentially, nor otherwise than required by prior art, but what I claim and desire to secure by Letters Patent is:—

1. A seat cover comprising a seat covering section approximately of the area of the upper surface of a seat cushion for which it is intended, a flap comprising a separate section of material having one edge lapping and secured to the front side edge of said section and arranged to enfold the front side edge of the cushion to which the cover is applied; and corner flaps comprising separate sections of material having their front edges overlapped by the ends of said first flap and their upper edges lapping and secured to the front corners of said seat covering section, said corner flaps being arranged to enfold the front corners of the cushion to which the cover is applied.

2. A seat cover comprising a seat covering section approximately of the area of the upper surface of the seat for which it is intended, flaps comprising separate sections of material having their upper edges lapping and secured to the respective ends of said seat covering section and arranged to enfold the ends of the cushion to which the cover is applied, a flap comprising a separate section of material having one edge lapping and secured to the front side edge of said seat covering section and arranged to enfold the front side edge of the cushion to which the cover is applied, and corner flaps comprising separate sections of material having their front edges overlapped by the ends of said last named flap and their upper edges lapping and secured to the front corners of said seat covering section, said corner flaps being arranged to enfold the front corners of the cushion to which the cover is applied.

3. A seat cover comprising a seat covering section, flaps comprising separate sections of material having free lower edges and their upper edges lapping and secured to the front and rear edges of said section respectively and arranged to enfold the front and rear sides of a cushion to which the cover is applied, flaps comprising separate sections of material having free lower edges and their upper edges lapping and secured to the ends of said seat covering section respectively and arranged to enfold the ends of the cushion to which the cover is applied, and corner flaps having free lower edges and their upper end edges lapping and secured to the front corners of said seat covering section respectively and arranged to enfold the corners of the cushion to which the cover is applied.

4. A seat cover comprising a seat covering section, flaps comprising separate sections of material having their upper edges lapping and secured to the front and rear edges of said section respectively and arranged to enfold the front and rear sides of a cushion to which the cover is applied, flaps comprising separate sections of material having their upper edges lapping and secured to the ends of said seat covering section respectively and arranged to enfold the ends of the cushion to which the cover is applied, and elastic corner flaps having their upper end edges lapping and secured to the front corners of said seat covering section respectively and arranged to enfold the corners of the cushion to which the cover is applied, and having their side edges lapping said front flap and said end flaps respectively.

5. A seat cover comprising a seat covering section approximately of the area of the upper surface of a seat cushion for which it is intended, a series of flaps comprising separate sections of material having their upper edges lapping and secured to the edges of said seat covering section and arranged to enfold the edges of the cushion to which the cover is applied and having their side edges spaced from each other, and a series of flaps comprising separate sections of material having their upper edges lapping and secured to said seat covering section and having their side edges overlapped by said first named flaps and secured thereto at a distance from the edges of said first named flaps.

6. A seat cover comprising a seat covering section, a flap comprising a separate section of material having its lower edge free and having its upper edge lapping and secured to the front edge of said section and being of a width to enfold and extend under the front edge of a cushion upon which said seat covering section is placed, and corner flaps comprising sections of elastic material having their upper edges lapping and secured to the front corners of said seat covering section and being of a width to enfold and extend under the front corners of the cushion to which the cover is applied and having their front edges lapping the ends of said first named flap.

7. A seat cover comprising a seat covering section having its side edges conforming generally to the contour of the side edges of the seat for which the cover is intended, flaps comprising separate sections of material having free lower edges and their upper edges lapping and secured to the front and rear edges of said section respectively and arranged to enfold and extend under the front and rear sides of a cushion to which the cover is applied, flaps comprising separate sections of material having free lower edges and their upper edges lapping and secured to the ends of said seat covering section respectively and arranged to enfold the ends of the cushion to which the cover is applied, and means forming a binder strip enfolding the lapped edges of said seat covering section and said flaps and also forming a pliable frame that is located above the marginal portions of the seat when the seat cover is properly applied on the seat.

HARRY G. WEDLER.